(12) United States Patent
Wheatley

(10) Patent No.: US 7,025,403 B2
(45) Date of Patent: Apr. 11, 2006

(54) COVERING STRUCTURE HAVING AUTOMATIC COUPLING SYSTEM

(76) Inventor: Donald G. Wheatley, 4451 Ford Rd., Ann Arbor, MI (US) 48105

( * ) Notice: Subject to any disclaimer, the term of this patent is extended or adjusted under 35 U.S.C. 154(b) by 0 days.

(21) Appl. No.: 11/227,019

(22) Filed: Sep. 15, 2005

(65) Prior Publication Data

US 2006/0006690 A1   Jan. 12, 2006

Related U.S. Application Data

(63) Continuation of application No. 10/826,079, filed on Apr. 16, 2004.

(51) Int. Cl.
  *B60P 7/02* (2006.01)
(52) U.S. Cl. .............................. 296/100.16; 296/100.15
(58) Field of Classification Search .......... 296/100.16, 296/100.18, 37.6, 121, 100.15
  See application file for complete search history.

(56) References Cited

U.S. PATENT DOCUMENTS

| | | | | |
|---|---|---|---|---|
| 5,076,338 A | * | 12/1991 | Schmeichel et al. | ... 296/100.16 |
| 5,207,262 A | * | 5/1993 | Rushford | ............... 296/100.16 |
| 5,984,379 A | * | 11/1999 | Michel et al. | ......... 296/100.16 |
| 6,042,174 A | * | 3/2000 | Durrani | ...................... 296/121 |
| 6,234,561 B1 | * | 5/2001 | Huotari | ................. 296/100.16 |
| 6,322,129 B1 | * | 11/2001 | Huotari | ................. 296/100.16 |
| 6,561,561 B1 | * | 5/2003 | Getzschman et al. | ...... 296/37.6 |
| 6,607,234 B1 | * | 8/2003 | Schmeichel | ............ 296/100.16 |
| 6,672,644 B1 | * | 1/2004 | Schmeichel | ............ 296/100.15 |
| 6,811,203 B1 | * | 11/2004 | Wheatley | ............... 296/100.15 |
| 2001/0010430 A1 | * | 8/2001 | Mentink | ................ 296/107.01 |
| 2001/0042987 A1 | | 11/2001 | Getzschman et al. | |
| 2004/0124658 A1 | | 7/2004 | Wheatley | |
| 2004/0212212 A1 | * | 10/2004 | Spencer et al. | ........ 296/100.16 |

\* cited by examiner

*Primary Examiner*—Kiran B. Patel
(74) *Attorney, Agent, or Firm*—Harness, Dickey & Pierce, P.L.C.

(57) ABSTRACT

A tonneau system for a cargo box of a vehicle having a support frame connectable to the cargo box. A cover spans the support frame and is positionable between a tensioned position and an untensioned position. A bow member is coupled to the cover and is moveable between a first position and a second position in response to the movement of the cover between the tensioned position and the untensioned position. A retaining member is then operably coupled to the support frame. The retaining member retains the bow member when the bow member is in the first position and releases the bow member when the bow member is in the second position.

19 Claims, 12 Drawing Sheets

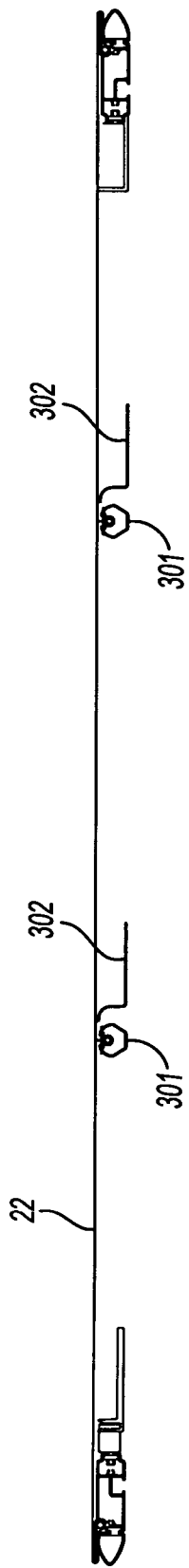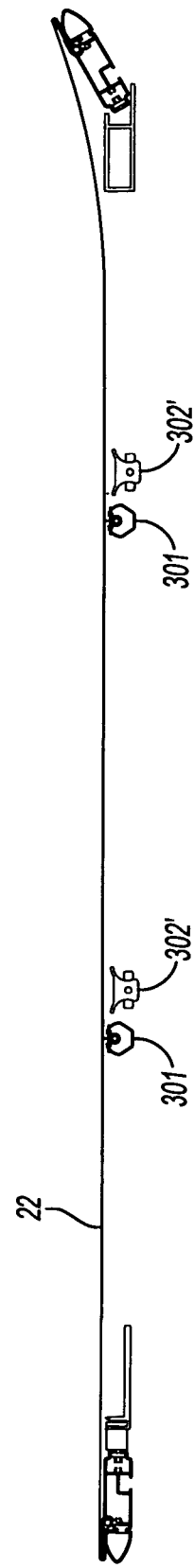

ously coupled between a soft tarp of the tonneau cover and the sidewalls of the cargo box of the pickup truck. This arrangement permits the tarp to be coupled to the cargo box to conceal the contents thereof or, alternatively, to be rolled up to reveal the contents of the cargo box of the pickup truck. The VELCRO® has disadvantages of wearing over time, pulling, and not allowing the fabric to move freely, which may result in a puckered and wrinkled appearance.

COVERING STRUCTURE HAVING AUTOMATIC COUPLING SYSTEM

CROSS-REFERENCE TO RELATED APPLICATIONS

This application is a continuation of U.S. patent application Ser. No. 10/826,079 filed on Apr. 16, 2004. The disclosure of the above application is incorporated herein by reference.

FIELD OF THE INVENTION

The present invention generally relates to coverings for pickup trucks and, more particularly, relates to a roll up tonneau cover system.

BACKGROUND OF THE INVENTION

Tonneau covers have been used for a number of years to cover the cargo box of pickup trucks against dirt, debris, and other environmental contaminants and to improve the aesthetic quality thereof. Current tonneau covers often employ a VELCRO® hook-and-loop fastening system operably coupled between a soft tarp of the tonneau cover and the sidewalls of the cargo box of the pickup truck. This arrangement permits the tarp to be coupled to the cargo box to conceal the contents thereof or, alternatively, to be rolled up to reveal the contents of the cargo box of the pickup truck. The VELCRO® has disadvantages of wearing over time, pulling, and not allowing the fabric to move freely, which may result in a puckered and wrinkled appearance.

A series of bows are typically coupled to the tarp and span the width of the cargo box. These bows serve to support and minimize accumulation of dirt, debris, and other environmental contaminants from collecting on top of the tarp. When the tarp is rolled up, these bows are often enclosed within the tarp bundle.

Typically, these bows are cylindrical in cross-section and the ends thereof rest upon rails fixed to longitudinal sidewalls of the cargo box of the pickup truck. However, often times these bows fail to minimize the lifting action caused by aerodynamic forces during vehicle travel. That is, conventional soft or roll-up type tonneau covers often suffer from flapping at highway speeds, which can lead to premature failure.

Accordingly, there exists a need in the relevant art to provide a tonneau cover system capable of overcoming the aerodynamic lifting forces caused during vehicle travel. Additionally, there exists a need in the relevant art to provide a tonneau cover system capable of reliably coupling the tonneau cover to the vehicle at various longitudinal locations. Still further, there exists a need in the relevant art to provide a tonneau cover system capable of overcoming the disadvantages of the prior art.

SUMMARY OF THE INVENTION

According to the principles of the present invention, a tonneau system for a cargo box of a vehicle having an advantageous construction is provided. The tonneau cover system includes a support frame connectable to the cargo box. A cover spans the support frame and is positionable between a tensioned position and an untensioned position. A bow member is coupled to the cover and is moveable between a first position and a second position in response to the movement of the cover between the tensioned position and the untensioned position. A retaining member is then operably coupled to the support frame. The retaining member retains the bow member when the bow member is in the first position and releases the bow member when the bow member is in the second position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 13 is a cross section view illustrating the tonneau cover system of the present invention in the retained position employing a retaining bracket; and FIG. 14 is a cross section view illustrating the tonneau cover system of the present invention in the released position employing a retaining block member.

DETAILED DESCRIPTION OF THE PREFERRED EMBODIMENTS

The following description of the preferred embodiments is merely exemplary in nature and is in no way intended to limit the invention, its application, or uses.

Figure 1:
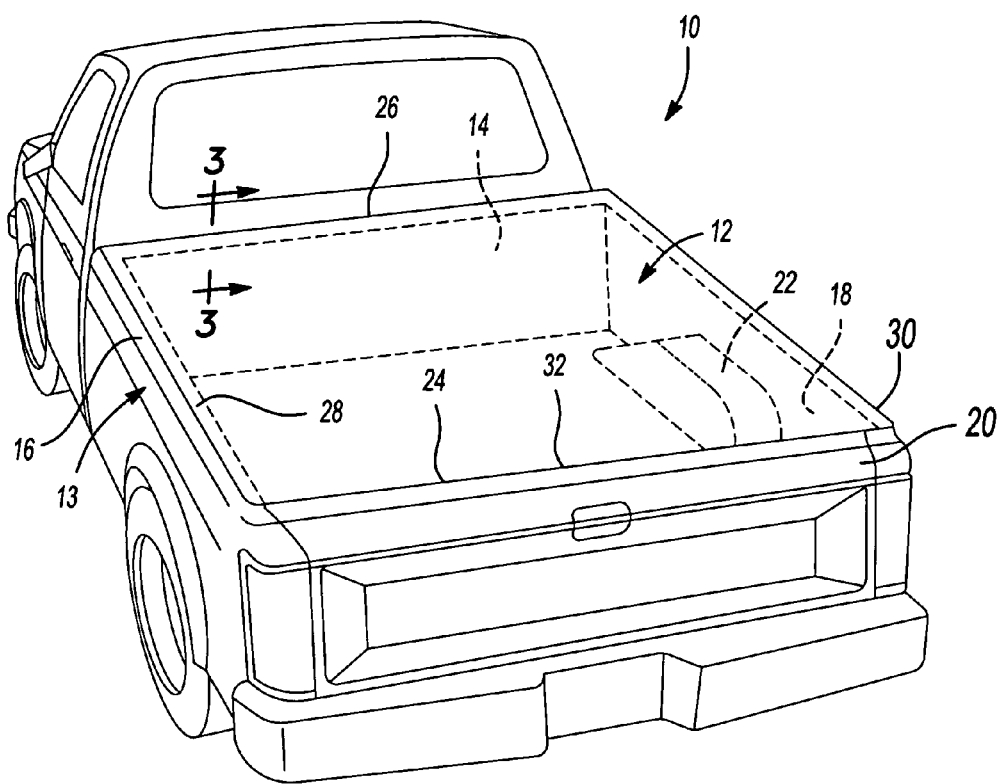
FIG. 1 is a perspective view illustrating a pickup truck having a tonneau cover system according to the principles of the present invention.
Figure 2:
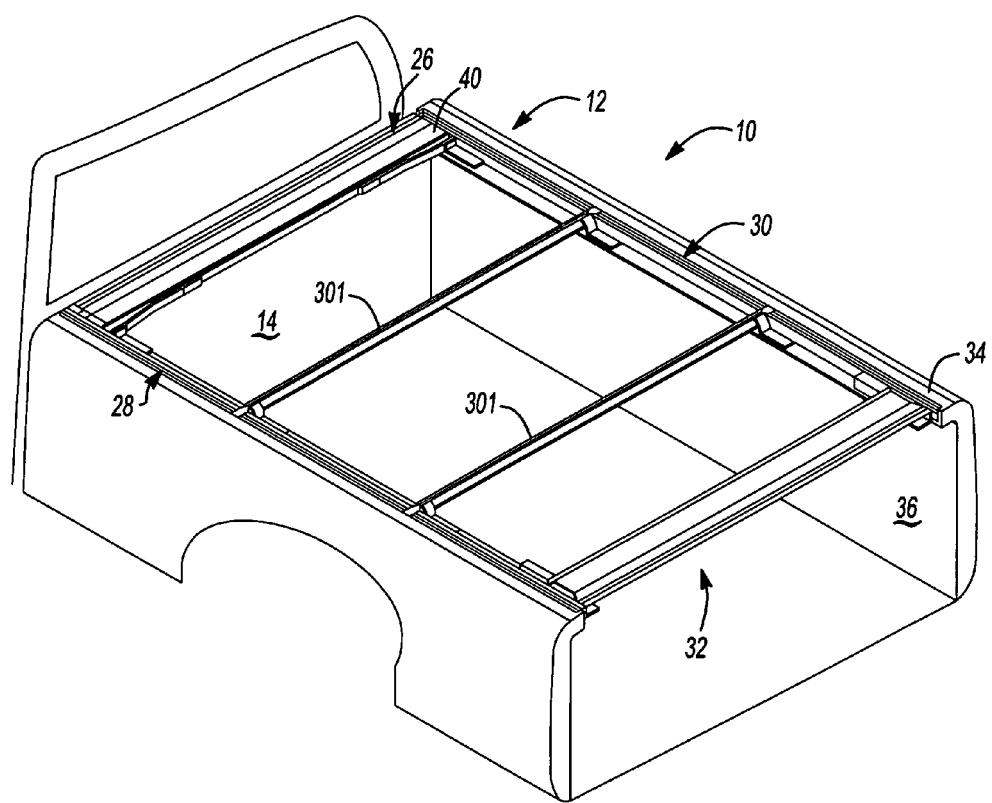
FIG. 2 is a perspective view illustrating the pickup truck having the tonneau cover system according to the principles of the present invention with portions removed for clarity.

With reference to FIGS. 1 and 2, a pickup truck 10 is shown having a roll up tonneau system 12 which is attached to a cargo box 13 according to the present invention. Cargo box 13 has a front wall 14, a left sidewall 16, a right sidewall 18, and a rear wall or tailgate 20. Roll up tonneau system 12 includes a flexible, stretchable fabric cover 22 that is drawn tightly over a substantially rigid rail support system 24 and removably attached to rail support system 24. Rail support system 24 is comprised of a number of frame rails that are attached to one another to form a rectangular frame. The frame rails included are a front frame rail or head rail assembly 26, a left side frame rail assembly 28, a right side frame rail assembly 30, and a rear frame rail assembly 32. Rail support system 24 is aligned with and coupled to the top of sidewalls 16 and 18 of cargo box 13 as well as the top of front wall 14 and tailgate 20, according to one of many methods. A clamping system or fastening system may be used to fasten the rail assemblies 26, 28, 30, and 32 to the sidewalls 16 and 18 of pickup truck 10. An example of a clamping system can be found in commonly-assigned U.S. patent application Ser. No. 10/331,711, entitled "Roll Up Tonneau Cover System." The disclosure of this application is incorporated herein by reference. Stretchable fabric cover 22 is support cross-vehicle via a plurality of cross bows 301, which each selectively engage corresponding retaining members coupled to left side frame rail assembly 28 and right side frame rail assembly 30, which will be discussed in detail below.

It should be understood that right sidewall 18 and left sidewall 16 of pickup truck 10 and the corresponding right side frame rail assembly 30 and left side frame rail assembly 28 are identical in construction, yet arranged in mirrored symmetry. Accordingly, in the interest of brevity, only one side will be discussed in detail below unless noted otherwise.

Still referring to FIGS. 1 and 2, right side frame rail assembly 30 is coupled to right sidewall 18 of cargo box 13 of pickup truck 10. As can be seen, sidewall 18 of cargo box 13 includes a generally horizontal top surface 34 and a downwardly extending inside wall 36. However, it should be appreciated that generally horizontal top surface 34 and downwardly extending inside wall 36 may have any one of a number of configurations, which are dependent upon styling and functionality determined by the vehicle manufacturer. Hence, it should be understood that the particular shape of these surfaces/walls may vary, along with the specific shape of those corresponding components of frame rail assembly 30.

Figure 3:
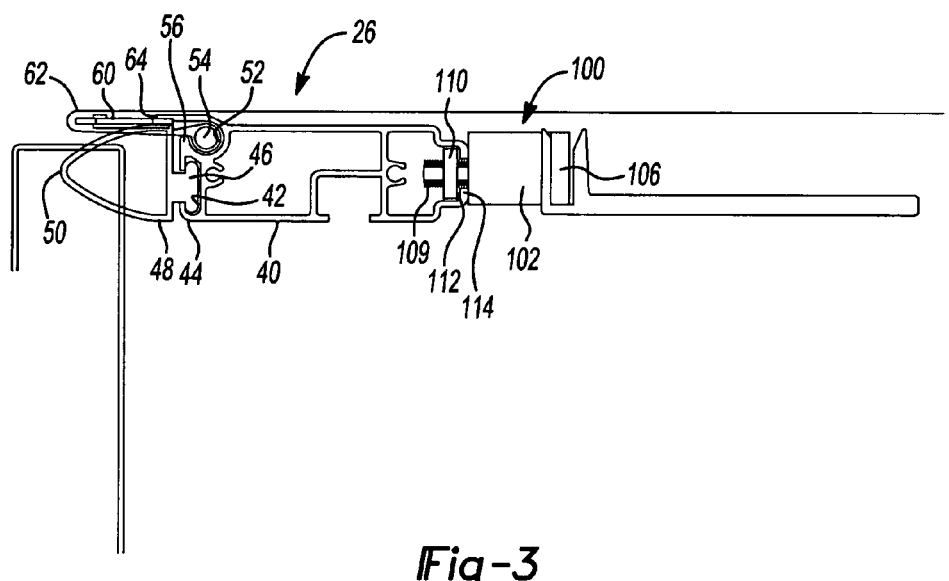
FIG. 3 is a cross sectional view illustrating the head rail assembly taken along line 3—3 of FIG. 1.

Turning now to FIG. 3, head rail assembly 26 will now be described in detail. As can be seen in the figure, head rail assembly 26 generally includes an extruded front bracket member 40. Extruded front bracket member 40 is preferably made of a light-weight, corrosion resistant material, such as aluminum. Extruded front bracket member 40 includes a gasket channel 42 extending longitudinally along a forward portion 44 of extruded front bracket member 40. Gasket channel 42 is sized to receive a corresponding channel feature 46 of a flexible gasket member 48 such that flexible gasket member 48 is coupled with and supported by extruded front bracket member 40. Gasket member 48 is positionable such that it engages and forms a fluid seal between a nose portion 50 of gasket member 48 and front wall 14 of pickup truck 10. In this regard, water and other environmental contaminants are prevented from entering cargo box 13 of pickup truck 10. During assembly, channel feature 46 of flexible gasket member 48 is slid into gasket channel 42.

Extruded front bracket member 40 further includes cover retaining slot 52 extending longitudinally along forward portion 44 of extruded front bracket member 40. Cover retaining slot 52 is sized to receive a corresponding rod member 54. Preferably, rod member 54 is received within a channel 56 sewn or otherwise formed in stretchable fabric cover 22. In this regard, stretchable fabric cover 22 is reliably retained in connection with extruded front bracket member 40. During assembly, rod member 54 is first slid into channel 56 of stretchable fabric cover 22 and the two are slid into cover retaining slot 52.

Still referring to FIG. 3, extruded front bracket member 40 further includes a tip support 60 extending along forward portion 44. Tip support 60 is adapted to be received between a fold-back portion 62 of stretchable fabric cover 22 and provides support to stretchable fabric cover 22. Tip support 60 permits stretchable fabric cover 22 to extend forward from extruded front bracket member 40 to bridge a gap between extruded front bracket member 40 and front wall 14 and to further conceal gasket member 48. Tip support 60 may be received within a support channel 64 formed in extruded front bracket member 40. However, it should also be understood that tip support 60 may be integrally formed with extruded front bracket member 40 or may be part of a separate polymer extrusion to which the stretchable fabric cover 22 is sewn. This extrusion would be slidably engaged with bracket member 40.

Figure 4:
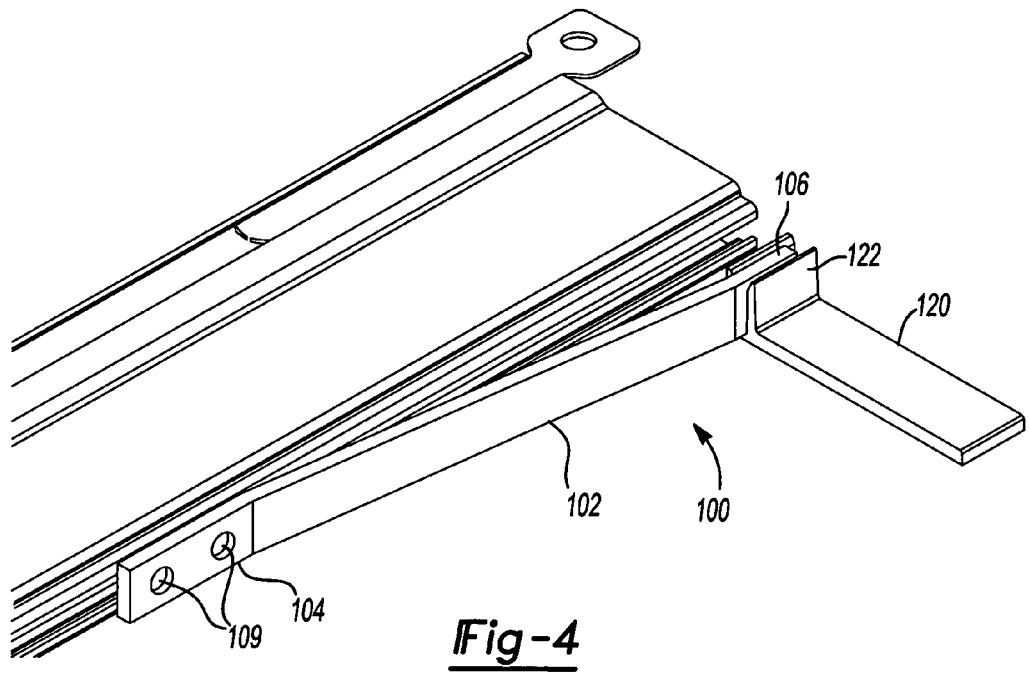
FIG. 4 is an enlarged perspective view illustrating the adjustment beam mechanism.

Referring now to FIGS. 3 and 4, tonneau system 12 further includes an adjustment beam mechanism 100 engagable with extruded front bracket member 40. Adjustment beam mechanism 100 is provided for maintaining a constant tensional force on stretchable fabric cover 22 to a desired tightness. Adjustment beam mechanism 100 includes a cantilever beam member 102 having a first end 104 and a second end 106. First end 104 of cantilever beam member 102 is fixedly mounted to extruded front bracket member 40 via conventional fasteners 109 and a mounting bracket 110. Mounting bracket 110 is slidably engaged in slot 112 of extruded front bracket member 40. Mounting bracket 110 is preferably sized to permit simple positioning of mounting bracket 110 and cantilever beam member 102 relative to extruded front bracket member 40 when the fasteners are loosened. However, on the other hand, mounting bracket 110 should preferably frictionally engage flanges 114 when the fasteners are tightened.

As best seen in FIGS. 2-4, adjustment beam mechanism 100 further includes a finger member 120, which is operably coupled to frame rail assembly 30. Finger member 120 is sized to extend upward from frame assembly 30 in a generally L-shaped configuration. An end 122 of finger member 120 is engagable with second end 106 of cantilever beam member 102. Such engagement of finger member 120 against the biasing force of cantilever beam member 102 cause extruded front bracket member 40 to be urged forward (relative to the vehicle) to draw stretchable fabric cover 22 tightly over rail support system 24.

It should be understood that cantilever beam member 102 may be pre-bent to tailor a desired biasing force. It is generally desired that adjustment beam mechanism 100 is disposed on each side of the vehicle bed to provide equal tensioning thereabout. Specifically, it is desired that adjustment beam mechanism 100 is arranged to provide about 15 to 10 pounds of tensioning force on each side.

Figure 5:
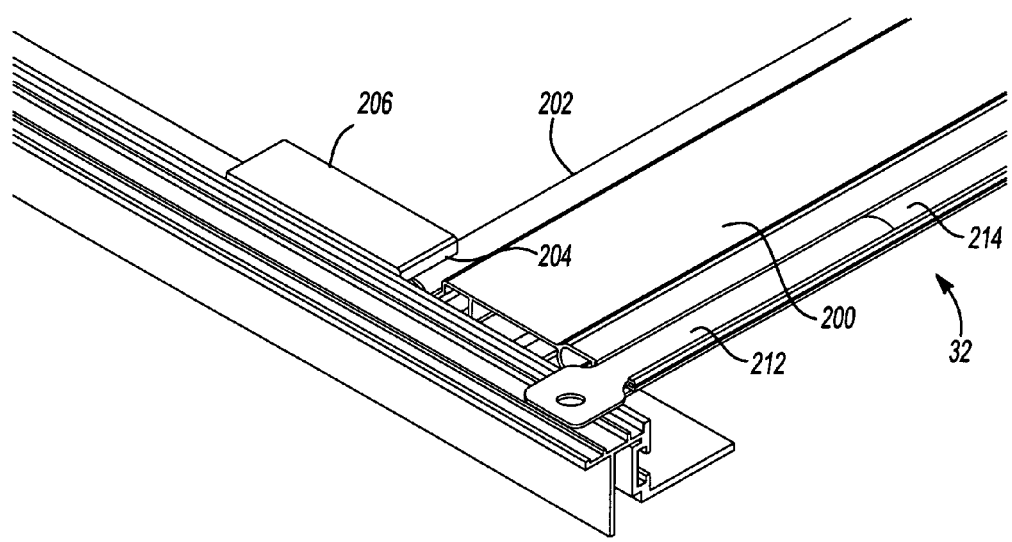
FIG. 5 is an enlarge perspective view illustrating the rear frame rail assembly.

Turning now to FIG. 5, rear frame rail assembly 32 will be described in detail. Rear frame rail assembly 32 generally includes an extruded rear bracket member 200. Rear bracket member 200 is similar in construction to front bracket member 40; however, rear bracket member 200 includes a rounded bull nose portion 202. Rear bracket member 200 further includes a receiving channel 56' for receiving rod member 54 coupled to fabric cover 22 similarly as mentioned above. Rear frame rail assembly 32 still further includes a latching system, such as that described in commonly-assigned U.S. patent application Ser. No. 10/331,711, entitled "Roll Up Tonneau Cover System."

With continued reference to FIG. 5, rounded bull nose portion 202 of rear bracket member 200 is sized to be pivotally received within a concave portion 204 of a corresponding rear pivot block 206. In this regard, rear frame rail assembly 32 may pivot upward about the interface between rounded bull nose portion 202 and concave portion 204 into a raised position (see FIG. 6). In this raised position, the tension in fabric cover 22 is released. However, in a lowered position, the tension is then again exerted upon fabric cover 22 according to the biasing force of adjustment beam mechanism 100. Rear pivot block 206 is fixedly coupled to frame rail assembly 30 via conventional means, such as fasteners. It should be appreciated that as rear bracket member 200 is lowered into a down position, fabric cover 22 is drawn rearward against the biasing force of adjustment beam mechanism 100. During this operation, fabric cover 22 is translated rearward a predetermined distance. This translation distance will be used to affect additional retaining features that will be described in detail below. During an opposition operation, namely the raising or pivoting of rear bracket member 200 causes the tension in fabric cover 22 to be released, which causes fabric cover 22 to translate forward in response to the biasing forces of adjustment beam mechanism 100.

Still referring to FIG. 5, rear bracket member 200 further includes a strip member 212 extending along rearward portion 210. Strip member 212 is adapted to be sewn into fabric cover 22 and provides support to stretchable fabric cover 22. Strip member 212 may be received within a support channel 214 formed in rear bracket member 200. However, it should also be understood that strip member 212 may be integrally formed with rear bracket member 200.

Figure 6:
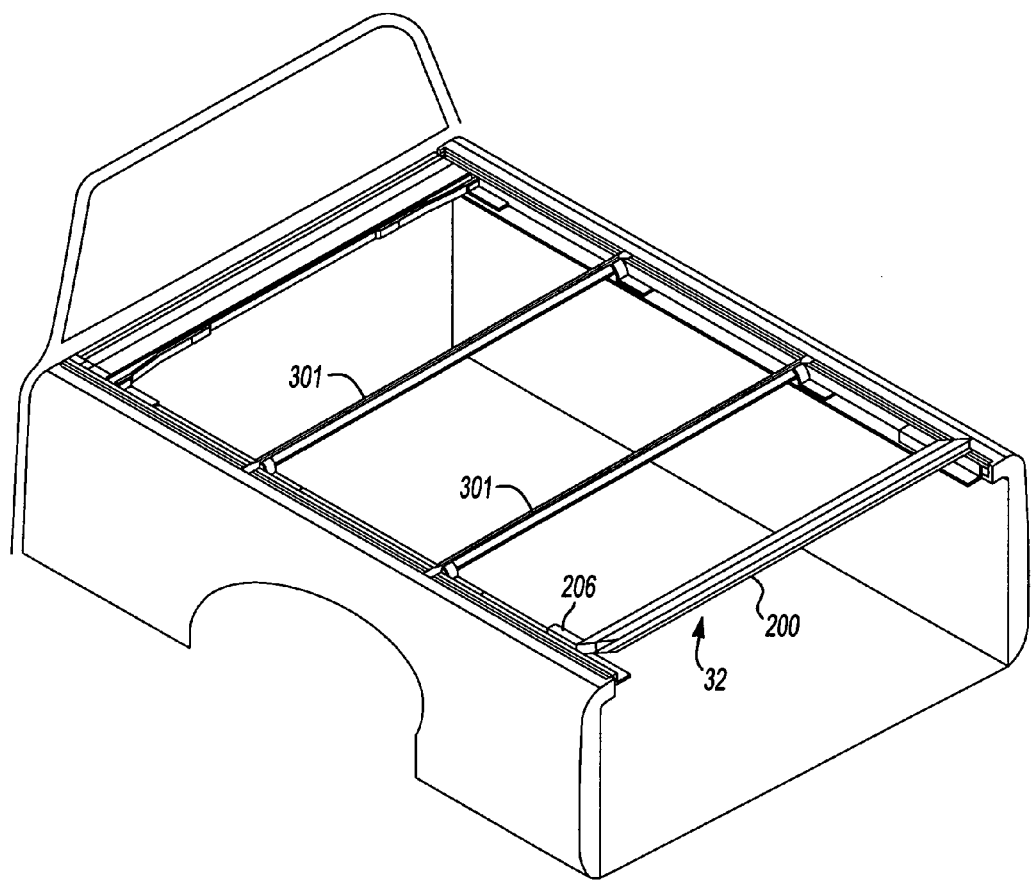
FIG. 6 is a perspective view illustrating the pickup truck having the tonneau cover system with portions removed for clarity and the rear frame rail assembly in a raised position.
Figure 7:
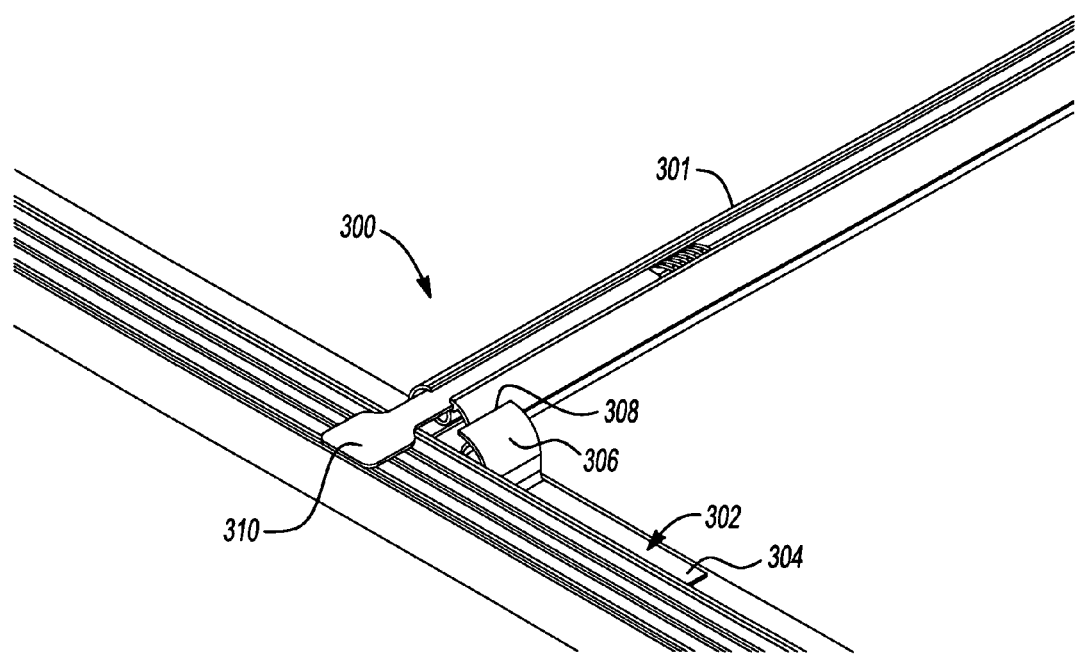
FIG. 7 is an enlarged perspective view illustrating the bow member and retaining bracket.

Turning now to FIGS. 6 and 7, it can be seen that tonneau system 12 further includes a retaining system 300 for retaining sections of fabric cover 22 located between head rail assembly 26 and rear frame rail assembly 32. As best seen in FIG. 6, retaining system 300 includes a plurality of cross vehicle bow members 301 operably coupled with fabric cover 22 and engaging retaining brackets 302 fixedly coupled to frame rail assembly 28, 30. Retaining brackets 302 may be of any shape or design; however, two possible configurations will be discussed herein.

With reference to FIGS. 6 and 7, retaining bracket 302 is illustrated as a generally sheet-like member shaped to define a generally planar section 304 and a receiving section 306. Planar section 304 is disposed adjacent frame rail assembly 28, 30 and fastened thereto via conventional means, such as fasteners. Receiving section 306, however, is shaped to receive a corresponding portion of vehicle bow member 301. That is, in the embodiment illustrated in FIGS. 6 and 7, vehicle bow member 301 is generally cylindrical in cross-section. Accordingly, receiving section 306 is generally cylindrical, concave in shape to readily receive and retaining vehicle bow member 301 therein. Receiving section 306 extends upward to an end 308, which is positioned relative to vehicle bow member 301 to generally prevent vehicle bow member 301 from disengaging with retaining bracket 302 in a vertical direction.

Vehicle bow member 301 is generally cylindrical in cross-section. Vehicle bow member 301 may define an enclosed tubular member or may be constructed of rolled aluminum, or other material. Preferably, vehicle bow member 301 further includes an optional paddle-shaped bow end 310 extending outwardly from vehicle bow member 301. Paddle-shaped bow end 310 overlaps a portion of frame rail assembly 28, 30. Paddle-shaped bow end 310 serves to push outwardly in a lateral direction (in the cross-vehicle direction) keeping the stretchable fabric cover 22 taunt. Paddle-shaped bow end 310 further biases the periphery of stretchable fabric cover 22 down to seal against frame rail assembly 28, 30. Frame rail assembly 28, 30 have alternating high and low sections that act as a labyrinthian seal.

Figure 8:
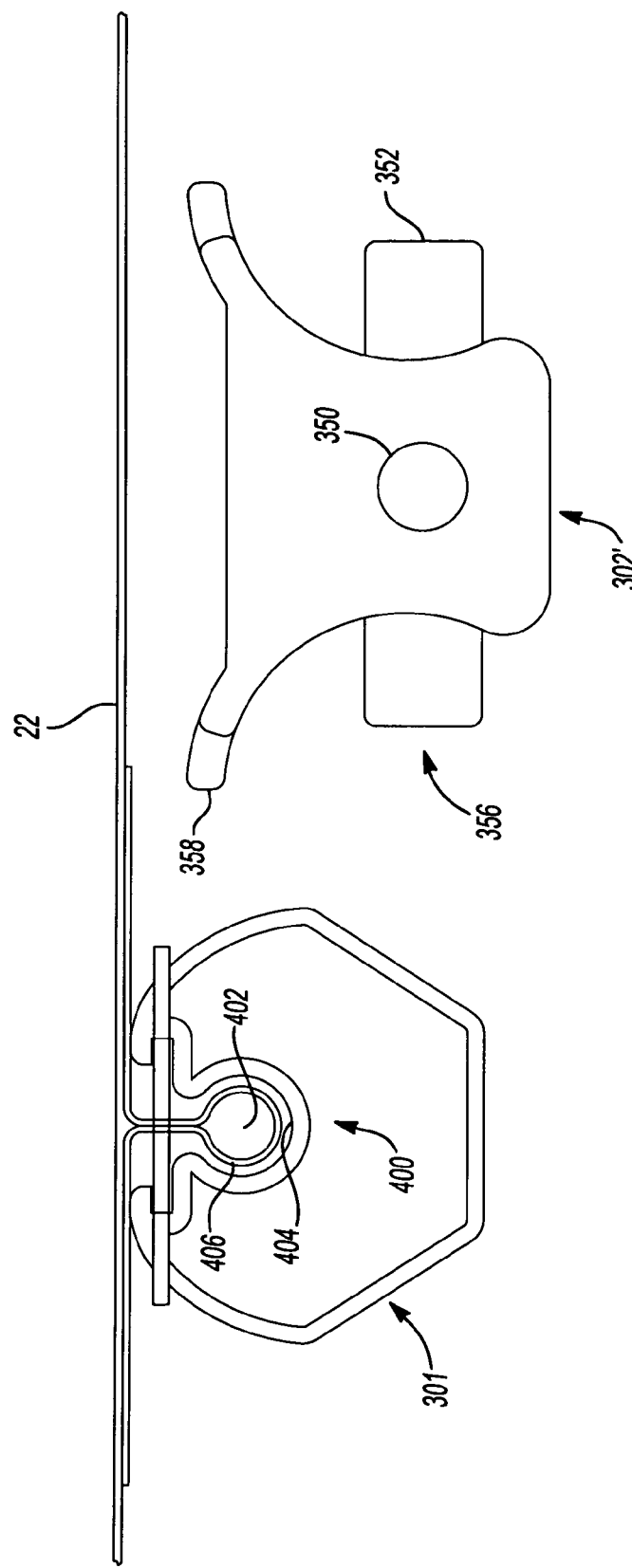
FIG. 8 is a side view illustrating the bow member and retaining block member in a released position.
Figure 9:
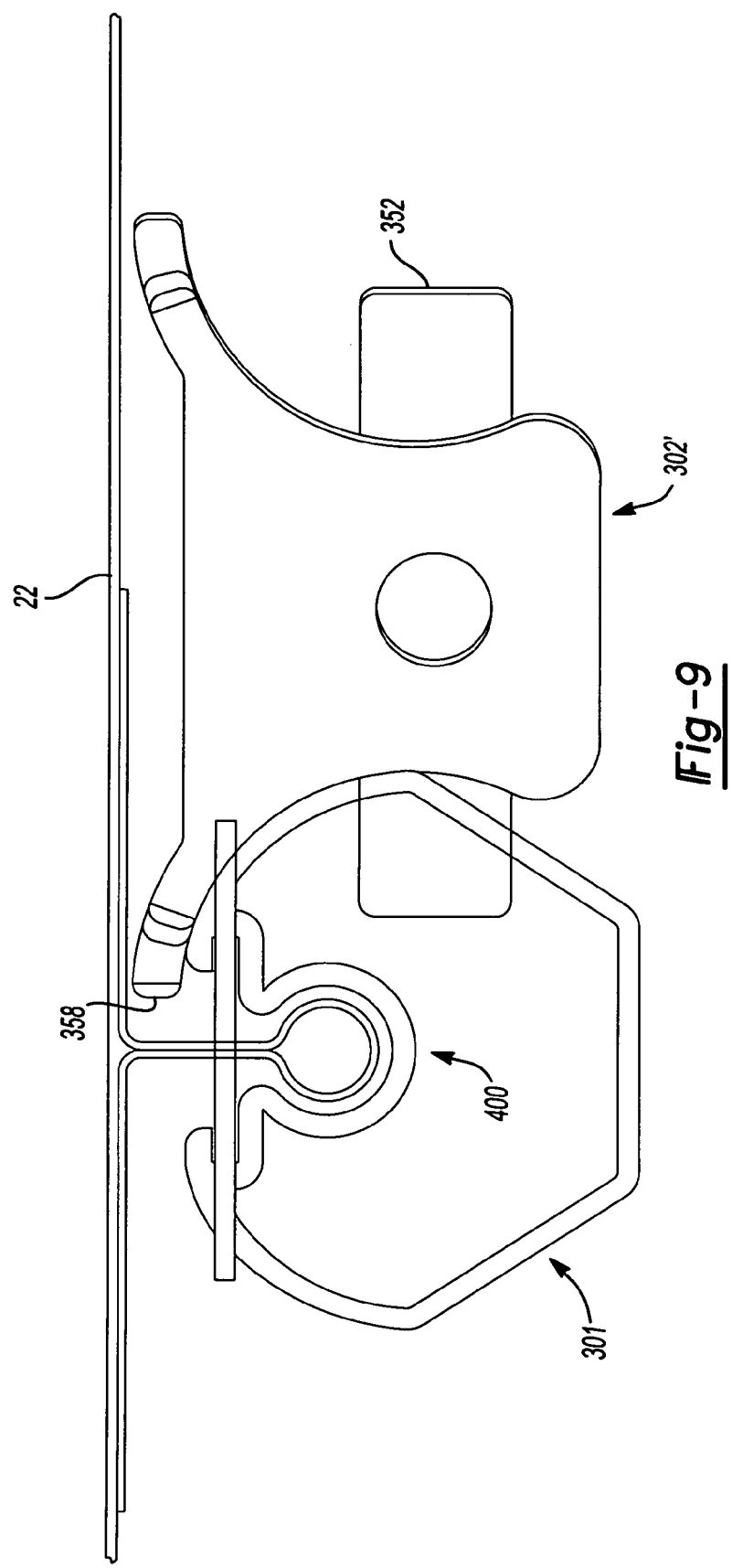
FIG. 9 is a side view illustrating the bow member and retaining block member in a retained position.
Figure 10:
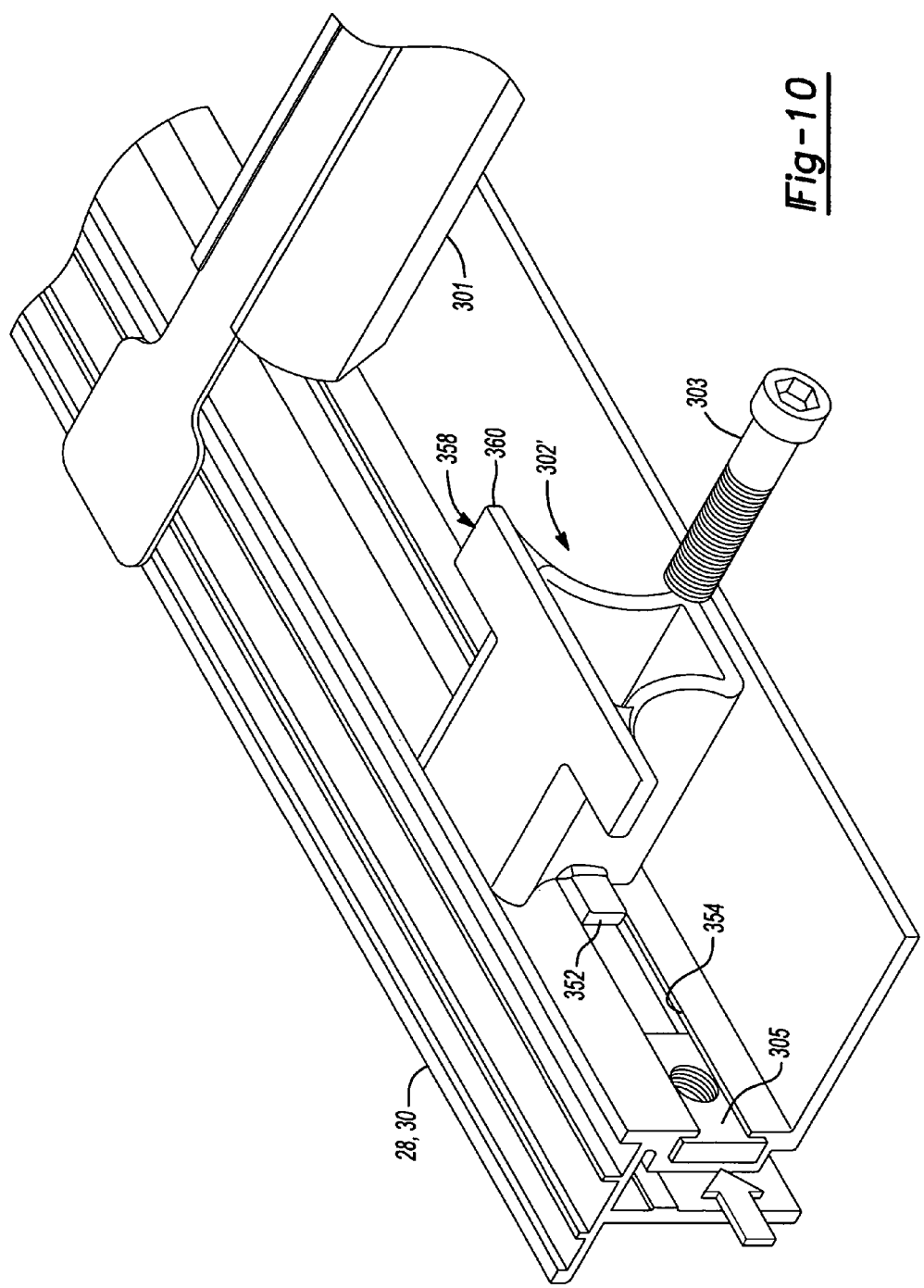
FIG. 10 is an enlarged perspective view illustrating the retaining block member.
Figure 11:
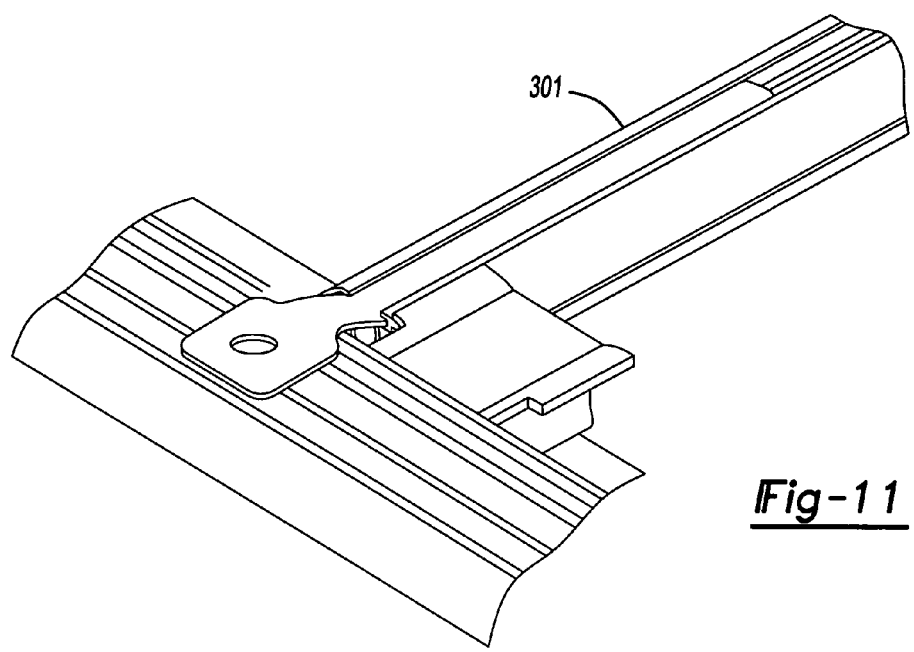
FIG. 11 is an enlarged perspective view illustrating the bow member in the retained position.
Figure 12:
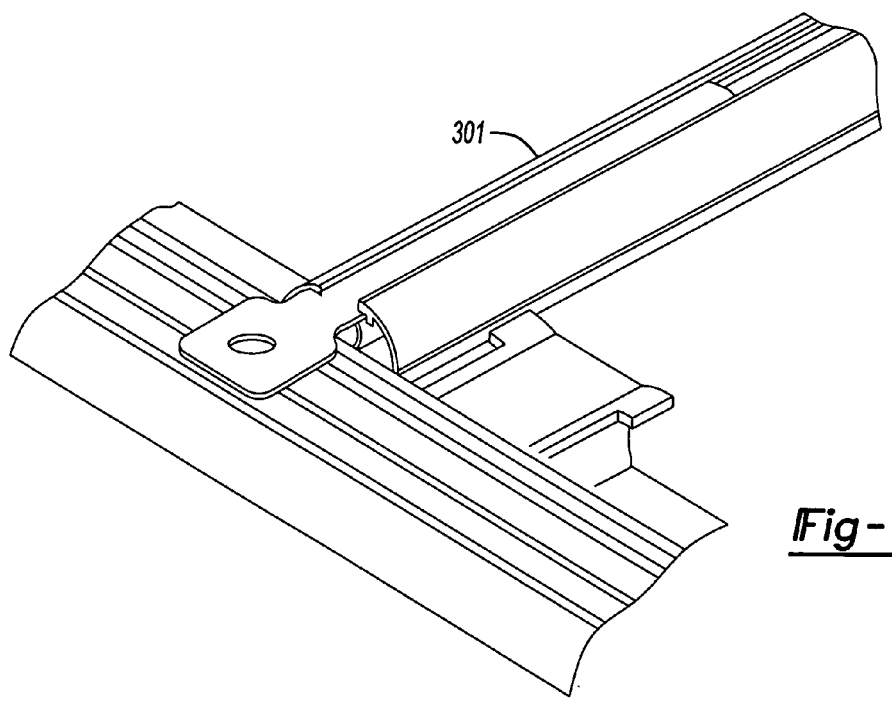
FIG. 12 is an enlarged perspective view illustrating the bow member in the released position.

Alternatively, as seen in FIGS. 8–12, retaining bracket 302 may be made as a block member, generally indicated at 302'. Retaining block member 302' is preferably made of a Nylon or other plastic material and is injection molded. Retaining block member 302' is preferably fastened to frame rail assembly 28, 30 via a fastener 303 extending through an aperture 350 formed in retaining block member 302'. Fastener 303 engages a sliding bracket 305 received within frame rail assembly 28, 30. Retaining block member 302' further includes a tab member 352 that is sized to be slidably received within a channel 354 of frame rail assembly 28, 30. Tab member 352 and channel 354 cooperate to prevent, or at least, minimize rotation of retaining block member 302' to ensure proper positioning of retaining block member 302'. Retaining block member 302' further includes a receiving section 356, which is shaped to receive a corresponding portion of vehicle bow member 301. That is, in the embodiment illustrated in FIGS. 8–12, vehicle bow member 301 is generally cylindrical in cross-section. Accordingly, receiving section 356 is generally cylindrical, concave in shape to readily receive and retaining vehicle bow member 301 therein. Receiving section 356 extends upward to an end 358, which is positioned relative to vehicle bow member 301 to generally prevent vehicle bow member 301 from disengaging from retaining block member 302' in a vertical direction. More particularly, as seen in FIG. 10, end 358 may terminate at a single finger 360, if desired.

Turning now to FIGS. 13 and 14, it can be seen that vehicle bow member 301 is engaged and retained within receiving section 356 when rear bracket member 200 is lowered (see FIG. 13), while conversely vehicle bow member 301 is released and free to be raised when bracket member 200 is raised (see FIG. 14). It is worth noting that this operating is illustrated in FIGS. 13 and 14 in connection with retaining bracket 302 and retaining block member 302'.

As best seen in FIGS. 8 and 9, vehicle bow member 301 is coupled to fabric cover 22 through a coupling system 400. Coupling system 400 includes a rod or cord member 402 slidably received within a bow channel 404 extending longitudinally through vehicle bow member 301. Cord member 402 captures a portion 406 of fabric cover 22 simply by routing fabric cover 22 around cord member 402. The shape of bow channel 404 retaining cord member 402 therein, thereby preventing fabric cover 22 from disengaging from vehicle bow member 301. Most preferably, portion 406 of fabric cover 22 is sewn into fabric cover 22 to prevent migration of fabric cover 22 relative to cord member 402. It should be understood that this positive coupling of fabric cover 22 to vehicle bow member 301 (and the corresponding coupling of vehicle bow member 301 to either retaining bracket 302 or retaining block member 302') serves to retain and prevent rising of fabric cover 22 during vehicle travel.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of latching a cover of a vehicle, said method comprising:

providing a cover spanning at least a portion of a frame;

providing a bow member operably coupled to said cover and moveable therewith; and providing a retaining member extending from said frame; tensioning said cover thereby causing said bow member to engage said retaining member.

2. The method according to claim 1 wherein said tensioning said cover comprises:

providing a bracket member coupled to said cover; and pivoting said bracket member in a first direction such that said pivoting applies a tensioning force to said cover translating said cover in a first direction and causing said bow member to engage said retaining member.

3. The method according to claim 2, further comprising:

pivoting said bracket member in a second direction such that said pivoting releases said tensioning force in said cover thereby translating said cover in a second direction and causing said bow member to disengage said retaining member.

4. The method according to claim 1, further comprising:

applying a biasing force to said cover to maintain said bow member in engagement with said retaining member.

5. The method according to claim 4 wherein said applying a biasing force to said cover comprises applying a biasing force to said cover via a cantilever member fixedly coupled to said frame.

6. The method according to claim 1 wherein said tensioning said cover comprises:

tensioning said cover thereby causing said bow member to engage within an arcuate receiving section of said retaining member to retain said bow member against generally vertical movement.

7. The method according to claim 1, further comprising:

resisting rotational movement of said bow member relative to said frame during said tensioning said cover.

8. A method of latching a tonneau cover of a vehicle, said method comprising:

pivoting a bracket member to a lowered position, said bracket member being coupled to a cover, said cover being coupled to a bow member extending cross-vehicle, said pivoting of said bracket member applying a tensioning force to said cover thereby translating said cover causing said bow member to operably engage a retaining member coupled to the vehicle.

9. The method according to claim 8, further comprising:

applying a biasing force to the cover via a biasing member to maintain said tensioning force.

10. The method according to claim 8, further comprising:

pivoting said bracket member to a raised position to release said tensioning force thereby translating said cover causing said bow member to disengage from said retaining member.

11. The method according to claim 8, further comprising:

applying a biasing force to said cover to maintain said bow member in engagement with said retaining member.

12. The method according to claim 11 wherein said applying a biasing force to said cover comprises applying a biasing force to said cover via a cantilever member.

13. The method according to claim 8, further comprising:

resisting rotational movement of said bow member about its axis during said applying a tensioning force to said cover.

14. A method of assembling a tonneau cover of a vehicle, said vehicle having a cargo box, said method comprising:

connecting a support frame to the cargo box;

spanning a cover across at least a portion of said support frame, coupling a bow member to said cover for movement therewith; and tensioning said cover such that said cover translates said bow member into engagement with a retaining member.

15. The method according to claim 14 wherein said tensioning said cover comprises:

providing a bracket member coupled to said cover; and pivoting said bracket member such that said pivoting applies a tensioning force to said cover translating said cover into engagement with said retaining member.

16. The method according to claim 14, further comprising:

applying a biasing force to said cover to maintain said bow member in engagement with said retaining member.

17. The method according to claim 16 wherein said applying a biasing force to said cover comprises applying a biasing force to said cover via a cantilever member fixedly coupled to said support frame.

18. The method according to claim 14 wherein said tensioning said cover comprises:

tensioning said cover thereby causing said bow member to engage within an arcuate receiving section of said retaining member to retain said bow member against generally vertical movement.

19. The method according to claim 14, further comprising:

resisting rotational movement of said bow member relative to said support frame during said tensioning said cover.

* * * * *